(12) United States Patent
Rusert et al.

(10) Patent No.: US 9,635,342 B2
(45) Date of Patent: Apr. 25, 2017

(54) MULTI-VIEW ENCODING AND DECODING TECHNIQUE BASED ON SINGLE-VIEW VIDEO CODECS

(75) Inventors: Thomas Rusert, Kista (SE); Clinton Priddle, Carindale (AU); Zhuangfei Wu, Danderyd (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 871 days.

(21) Appl. No.: 13/877,560

(22) PCT Filed: Oct. 5, 2010

(86) PCT No.: PCT/EP2010/006072
§ 371 (c)(1),
(2), (4) Date: Apr. 3, 2013

(87) PCT Pub. No.: WO2012/045319
PCT Pub. Date: Apr. 12, 2012

(65) Prior Publication Data
US 2013/0188708 A1    Jul. 25, 2013

(51) Int. Cl.
*H04N 13/00* (2006.01)
*H04N 19/70* (2014.01)
(Continued)

(52) U.S. Cl.
CPC ..... *H04N 13/0048* (2013.01); *H04N 13/0003* (2013.01); *H04N 13/0007* (2013.01);
(Continued)

(58) Field of Classification Search
None
See application file for complete search history.

(56) References Cited

U.S. PATENT DOCUMENTS

2005/0147309 A1* 7/2005 Katata .............. H03M 7/30
382/239
2008/0089428 A1   4/2008 Nakamura et al.
(Continued)

FOREIGN PATENT DOCUMENTS

WO    2008047300 A2    4/2008
WO    2008047303 A2    4/2008

OTHER PUBLICATIONS

EPO, Written Opinion of the International Searching Authority, PCT/EP2010/006072.*
(Continued)

*Primary Examiner* — David N Werner
(74) *Attorney, Agent, or Firm* — Coats & Bennett, PLLC

(57) ABSTRACT

A technique for encoding and decoding data pertaining to multiple video views is presented. A method embodiment of the encoding technique comprises the steps of providing first picture stream belonging to a first view and performing a first encoding operation to encode a picture of the first picture stream. The first encoding operation is based on a single-view video codec and provides encoder state information relevant for the encoding of another picture of the first picture stream. Also provided is a second picture stream belonging to a second video view. A second encoding operation is performed to encode a picture of the second picture stream based on the single-view video codec, wherein the second encoding operation is based on the encoder state information provided by the first encoding operation. On the basis of the encoded picture of the first picture stream and encoded picture of the second picture stream, dedicated video streams are generated.

23 Claims, 8 Drawing Sheets

(51) Int. Cl.
*H04N 19/50* (2014.01)
*H04N 19/436* (2014.01)
*H04N 19/196* (2014.01)
*H04N 19/61* (2014.01)
*H04N 19/597* (2014.01)
*H04N 21/236* (2011.01)

(52) U.S. Cl.
CPC ......... *H04N 19/196* (2014.11); *H04N 19/436* (2014.11); *H04N 19/50* (2014.11); *H04N 19/597* (2014.11); *H04N 19/61* (2014.11); *H04N 19/70* (2014.11); *H04N 21/236* (2013.01)

(56) References Cited

U.S. PATENT DOCUMENTS

| | | | | |
|---|---|---|---|---|
| 2010/0086285 A1* | 4/2010 | Sasaki | ................. | G11B 27/105 386/212 |
| 2010/0208750 A1* | 8/2010 | Kim | ................. | H04N 13/0048 370/474 |
| 2011/0141234 A1* | 6/2011 | Tsukagoshi | ............. | H04N 7/52 348/43 |
| 2012/0212579 A1* | 8/2012 | Frojdh | ................ | H04N 19/597 348/43 |

OTHER PUBLICATIONS

The International Telecommunicaton Union Telecommunication Standartization Secotor, "Information Technology—Generic Coding of Moving Pictures and Associated Audio Information: Video", International Standard 13818-2, ITU-T Recommendation H.262, 2012, pp. 1-244, ITU-T Rec. H.262 (201X E).

The International Telecommunicaton Union Telecommunication Standartization Secotor, "Series H: Audiovisual and Multimedia Systems, Infrastructure of Audiovisual Services—Coding of Moving video, Advanced video coding for generic audiovisual services", Recommendation ITU-T H.264, Mar. 1, 2009, pp. 1-670, [Retrieved on Mar. 28, 2013], Retrieved from Internet: http://www.itu.int/rec/T-REC-H.264-200903-S/en.

* cited by examiner

```
Send_initialization_data(N)
For each time instance T
    For view = 0..N-1
        Min_cost = Infinity
        For stored_state = 0..N-1
            Load_state(stored_state)
            Cost = Test_Encode_pic(view,T)
            If Cost < Min_cost
                Best_state = stored_state
                Min_cost = Cost
        Load_state(Best_state)
        Encode_pic(view,T)
        Send_state_transfer_command(Best_state)
        Save_state(view)
```

NAL unit combination

- Combine 2 AVC bitstreams into one MVC bitstream

Take gop 3 for example     IPPIPPIPP
AVC NAL: 7 sps    8 pps     5 idr     1 non-idr-slice
MVC NAL: 14 prefix     20 coded slice extention     15 subset sps Original:
- Baselayer:     7 8 5 1 1 7 8 5 1 1
- Enhancelayer:     7 8 1 1 1 1 1 1

Modified:
- Baselayer:     7 8 14 5 14 1 14 1 7 8 14 5 14 1 14 1
- Enhancelayer:     15 8 20 20 20 15 8 20 20 20

Combined:
7 15 8 (8) 14 5 20 14 1 20 14 1 20 7 15 8 (8) 14 5 20 14 1 20 14 1 20

Fig. 6

```
N = Receive_initialization_data()
For each time instance T
    For view = 0..N-1
        State = Receive_state_transfer_command()
        Load_state(State)
        Decode_pic(view,T)
        Save_state(view)
```

MULTI-VIEW ENCODING AND DECODING TECHNIQUE BASED ON SINGLE-VIEW VIDEO CODECS

TECHNICAL FIELD

The present disclosure generally relates to video encoding and decoding mechanisms. In particular, a technique for encoding and decoding picture streams belonging to different video views is presented.

BACKGROUND

Media content distribution systems are becoming more and more popular. The data throughput of the associated distribution platforms such as YouTube and iTunes is immense. As a result, increasingly sophisticated data compression techniques are developed.

Data compression techniques are generally based on so-called codecs. The Advanced Video Coding (AVC) standard, also known as H.264 or Moving Pictures Expert Group (MPEG)-4 Part 10, defines a video compression codec that is based on eliminating redundancies both between subsequent pictures (temporal redundancy) as well as within a single picture (spatial redundancy) of a picture stream.

Scalable Video Coding (SVC) as specified in Annex G of the H.264/AVC specification allows the construction of a video bitstream that contains scaling sub-bitstreams each conforming to H.264/AVC. An encoded video bitstream is called scalable when parts of the bitstream can be removed such that the resulting sub-bitstream can still be decoded by a target decoder. The video content of the sub-bitstream can be reconstructed at a quality that is less than that of the original bitstream, but still high when considering the resulting reduction of transmission and storage resources AVC and SVC codecs are generally regarded as single-view video codecs, which means that redundancies are eliminated within the picture stream generated by a single video camera. Upcoming video features such as 3D ("stereoscopic") video and free viewpoint video are based on multiple picture streams generated by multiple video cameras.

Multi View Coding (MVC) as specified in Annex H of the H.264/AVC specification defines a video codec for multi-view scenarios. To increase the compression efficiency, MVC additionally exploits redundancies between pictures streams generated by different video cameras directed to essentially the same scene (but, e.g., from different positions).

Existing multi-view video codecs have to a large extent been built upon their single-view counterparts. With respect to MVC, reference is made to Peter Merkle, Karsten Müller, Aljoscha Smolic, and Thomas Wiegand: Efficient Compression of Multi-View Video Exploiting Inter-View Dependencies Based on H.264/MPEG4-AVC, IEEE International Conference on Multimedia and Expo (ICME'06), Toronto, Ontario, Canada, July 2006 and Michael Dröse, Carsten Clemens, and Thomas Sikora: Extending Single-View Scalable Video Coding to Multi-View based on H.264/AVC, IEEE International Conference on Image Processing (ICIP'06), Atlanta, Ga., USA, October 2006.

After a single-view video codec has been standardized, it typically takes months or even years until the associated multi-view codec becomes available. As an example, standardization of AVC was completed in 2003 and its SVC extension was standardized in 2007, but the MVC standard was introduced only in 2009. By the time a multiview codec derived from an existing single-view video codec has been standardized, there may thus already be a new single-view codec available with significantly improved compression efficiency.

At present, a new single-view video standard called High Efficiency Video Coding (HEVC), a successor to AVC, is being developed. As it may take years to standardize the multi-view counterpart of HEVC, it would be desirable to immediately make use of HEVC codecs for multi-view purposes instead of relying on existing multi-view video codecs such as MVC.

SUMMARY

There is generally a need for a technique for efficiently encoding data pertaining to multiple video views using a single-view video codec.

According to a first aspect, a method of encoding data pertaining to at least two video views is presented. The method comprises the steps of providing a first picture stream belonging to at least one first video view, performing a first encoding operation to encode at least a portion of a first picture of the first video stream, wherein the first encoding operation is based on a single-view video codec and provides encoder state information relevant for the encoding of at least a portion of a second picture of the first picture stream or another portion of the first picture, generating a first video stream comprising the encoded picture of the first picture stream, providing a second picture stream belonging to at least one second video view, performing a second encoding operation to encode at least a portion of a picture of the second picture stream based on the single-view video codec, wherein the second encoding operation is based on the encoder state information provided by the first encoding operation, and generating a second video stream comprising the encoded picture of the second picture stream.

The picture streams corresponding to the two or more video views may have been generated by different video cameras for 3D video, free viewpoint video or any similar video purpose. Therefore, there may at least in principle exist redundancies between picture streams belonging to different video views.

The present encoding approach may readily be extended to encode a third or higher order picture stream. The corresponding third or higher order encoding operation may be based on the encoder state information provided by any previous encoding operation (e.g., provided by the first encoding operation or provided by the immediate preceding encoding operation). As a result, a third or higher order video stream can be generated.

Each video stream may comprise a sequence of video frames and may have nonscaling (e.g., AVC compliant) or scaling (e.g., SVC compliant) properties. Moreover, each video stream may be transmitted after generation. The various video streams may be transmitted together (e.g., using time multiplexing) or separately. Transmission may take place from a multimedia server to a mobile or stationary client device (e.g., during a streaming session). Transmission control may be performed using the Real-time Transport Protocol (RTP) or any other transport protocol.

In one implementation, the two or more video streams that have been generated using a single-view video codec are transmitted in a multi-view format (i.e., in a format defined by a multi-view video specification). The multi-view format may be derived from MVC or any successor version thereof. Accordingly, the video streams may further be formatted and, if needed, enriched with supplementary information to generate a single video stream in a format that complies with a multi-view specification.

The data encoding method presented herein may further comprise transmitting state transfer information (e.g., in the form of commands). The state transfer information may relate to a transfer of the encoder state information provided by a preceding (e.g., the first) encoding operation for use by a following (e.g., the second) encoding operation. According to one variant, the state transfer information is transmitted together with one or more of the video streams (i.e., "in-band"). According to another variant, the state transfer information is transmitted separately from the video streams (i.e., "out-of-band"). According to a still further variant, the state transfer information is not transmitted at all as a receiver has a priori knowledge thereof.

In an exemplary implementation, transmission of the video streams is synchronized with the transmission of the state transfer information. This synchronization may aim at permitting a decoder to determine the particular decoder state information required for a particular decoding operation. As an example, the state transfer information may comprise information indicative of at least one of the particular picture (or picture portion) of the second picture stream that has been encoded in the second encoding operation based on the encoder state information and particulars of the first encoding operation that provided the encoder state information.

The encoder state information may relate to reference information for predictive encoding. The reference information may be indicative of pictures (e.g., of the first picture stream) that have already been encoded ("reference pictures") and are thus available for predictive encoding. The predictive encoding may, for example, result in so-called P-frames or B-frames. The encoder state information may also relate to reference information derived from or for picture portions that have already been encoded. Such picture portions may take the form of a subset of blocks, or macroblocks, of a picture as used, for example, for so-called intra-picture prediction within I-frames. Still further, the encoder state information may relate to states of, for example, an entropy coding engine in the encoder, such as CABAC or CAVLC in H.264/AVC. The encoder state information may also relate to information pertaining to motion vectors (e.g., previously encoded motion vectors).

In one example, the encoding operations performed in relation to the first picture stream are at least partially performed based on encoder state information, and (e.g., for backwards compatibility) the encoder state information on which these encoding operations are based is derived from one or more pictures of the first picture stream only. If backwards compatibility is not of importance, the encoder state information on which the encoding operations for the first picture stream are based can be derived from pictures of one or more picture streams different from the first picture stream.

According to one variant, the multiple encoding operations performed in relation to the multiple picture streams are performed by a single encoder (e.g., in a time-multiplexed manner). According to a second variant, each encoding operation in relation to a particular picture stream is performed by a separate encoder, with the separate encoders being arranged in parallel to each other. The first variant and the second variant may be combined to a third variant, according to which one or more picture streams are encoded by one or more individual encoders and two or more further picture streams are encoded jointly by a single encoder.

Various items of information may be transmitted in addition to the picture streams and the (optionally transmitted) state transfer information. As an example, the number of video views encoded and/or the number of encoders involved in encoding the video views may be signalled (e.g., from a multimedia server to a multimedia client).

The encoder state information provided by an encoding operation for one picture stream may immediately be forwarded to a subsequent encoding operation for another picture stream (e.g., in a scenario with separate encoders arranged in parallel). Alternatively, the encoder state information may be buffered at least temporarily before being transferred to the subsequent encoding operation (e.g., in a scenario with a single encoder).

As has already been briefly mentioned above, the technique presented herein may readily be extended to additional picture streams. Accordingly, the encoding method may further comprise providing a third picture stream belonging to at least one third video view and performing a third encoding operation to encode a picture of the third picture stream based on the single-view video codec. The third encoding operation is based on at least one of the encoder state information provided by the first encoding operation and encoder state information provided by the second encoding operation. The method may further include generating a third video stream comprising the encoded picture of the third picture stream.

According to a complementary aspect, a method of decoding data pertaining to at least two video views is presented. The method comprises the steps of providing a first video stream comprising encoded pictures belonging to at least one first video view, performing a first decoding operation to decode at least a portion of a first encoded picture of the first video stream, wherein the first decoding operation is based on a single-view video codec and provides decoder state information relevant for the decoding of at least a portion of a second encoded picture of the first video stream or another portion of the first encoded picture, providing a second video stream comprising encoded pictures belonging to at least one second video view, and performing a second decoding operation to decode at least a portion of an encoded picture of the second video stream based on the single-view video codec, wherein the second decoding operation is based on the decoder state information provided by the first decoding operation.

The data decoding method presented herein may further comprise providing state transfer information relating to a transfer of the encoder state information provided by the first encoding operation for use by the second encoding operation. The state transfer information may control a transfer of the decoder state information provided by the first decoding operation to the second decoding operation. According to a first example, the state transfer information is received concurrently with the video streams (either in-band or out-of-band). According to a second example, the state transfer information is a priori known on the decoder side.

A transfer of the decoder state information from the first decoding operation to the second decoding operation may be synchronized with the transfer of encoder state information from a first encoding operation to a second encoding operation. The synchronization may be achieved by control signals.

Each decoding operation for a particular video stream may be performed by a dedicated decoder, with the two or more decoders being arranged in parallel to each other. In such a case, the decoder state information may be communicated between the individual decoders (e.g., from the first decoder to each higher order decoder or from a preceding decoder to a single subsequent decoder only). Alternatively, decoding operations for multiple video streams may be performed by a single decoder (e.g., in a time-multiplexed manner). As has already been explained above with respect to the encoding operations, both decoding variants can be combined such that at least one decoder decodes a single video stream only whereas at least one further decoder jointly decodes at least two video streams.

The decoding approach may readily be extended to scenarios with three or more video streams. As an example, the decoding method may additionally comprise providing a third video stream comprising encoded pictures belonging to a third video view and performing a third decoding operation to decode at least one encoded picture of the third video stream based on the single-view video codec. The third decoding operation is based on at least one of the decoder state information provided by the first decoding operation and decoder state information provided by the second decoding operation. The decoder state information provided by a lower order (e.g., the first) decoding operation may at least temporarily be buffered for transfer to a higher order (e.g., the second) decoding operation. The decoder state information may relate to reference picture information for decoding another picture (e.g., in a predictive encoding scenario).

According to another aspect, a computer program product is provided. The computer program product comprises program code portions for performing one or more of the steps of one or more of the method aspects described herein when the computer program product is executed on one or more computing devices. The computer program product may be stored on a computer-readable recording medium such as a permanent or re-writeable memory, a CD-ROM, or a DVD. The computer program product may also be provided for download via one or more computer networks, such as the Internet, a cellular telecommunications network or a wireless or wired Local Area Network (LAN).

According to a still further aspect, an encoding stage adapted to encode data pertaining to at least two video views is provided. The encoding stage comprises one or more interfaces adapted to provide a first picture stream belonging to at least one first video view and a second picture stream belonging to at least one second video view, one or more encoders adapted to perform a first encoding operation to encode at least a portion of a first picture of the first picture stream, wherein the first encoding operation is based on a single-view video codec and provides encoder state information relevant for the encoding of at least a portion of a second picture of the first picture stream or another portion of the first picture, and to perform a second encoding operation to encode at least a portion of a picture of the second picture stream based on the single-view video codec, wherein the second encoding operation is based on the encoder state information provided by the first encoding operation, and one or more stream generators adapted to generate a first video stream comprising the encoded picture of the first picture stream and a second video stream comprising the encoded picture of the second picture stream.

The encoding stage may comprise a first encoder adapted to perform the first encoding operation and a second encoder adapted to perform the second encoding operation. The encoding stage may alternatively comprise an encoder adapted to perform both the first encoding operation and the second encoding operation. In scenarios with three or more picture streams, both variants can be combined as described above.

The encoding stage may further comprise a memory adapted to buffer the encoder state information provided by the first encoding operation for transfer to the second encoding operation. The buffer may be realized in the form of a ring buffer.

According to another aspect, a decoding stage adapted to decode data pertaining to at least two video views is provided. The decoding stage comprises one or more interfaces adapted to provide a first video stream comprising encoded pictures belonging to at least one first video view and a second video stream comprising encoded pictures belonging to at least one second video view, and one or more decoders adapted to perform a first decoding operation to decode at least a portion of a first encoded picture of the first video stream, wherein the first decoding operation is based on a single-view video codec and provides decoder state information relevant for the decoding of at least a portion of a second encoded picture of the first video stream or another portion of the first encoded picture, and a second decoding operation to decode at least a portion of an encoded picture of the second video stream based on the single-view video codec, wherein the second decoding operation is based on the decoder state information provided by the first decoding operation.

The decoding stage may comprise a first decoder adapted to perform the first decoding operation and the second decoder adapted to perform the second decoding operation. Alternatively, the decoding stage may comprise a decoder adapted to perform both the first decoding operation and the second decoding operation. As mentioned above, both variants may be combined in scenarios with three or more video streams.

The decoding stage may further comprise a memory adapted to buffer the decoder state information provided by the first decoding operation for transfer to the second decoding operation. The buffer may be realized in the form of a ring buffer.

The at least one interface of the encoding stage may comprise a network interface. Still further, this interface may comprise a memory interface (e.g., to retrieve the picture streams from a database) or one or more camera interfaces. In a similar manner, the at least one interface of the decoding stage may comprise a network interface (e.g., to receive the video streams during a streaming session), a memory interface (e.g., to retrieve the video streams from a database) or any other interface.

BRIEF DESCRIPTION OF THE DRAWINGS

In the following, the encoding and decoding technique will be described in more detail with reference to exemplary embodiments illustrated in the drawings, wherein FIG. 1 schematically illustrates a multimedia system embodiment with a multimedia server acting as sender and a multimedia client acting as receiver;

FIG. 6 illustrates an embodiment of generating an MVC compliant bitstream from two AVC bitstreams;

DETAILED DESCRIPTION

In the following description, for purposes of explanation and not limitation, specific details are set forth, such as specific device configurations and specific video content handling, storage and streaming scenarios in order to provide a thorough understanding of the technique disclosed herein. It will be apparent to one skilled in the art that the technique may be practiced in other embodiments that depart from these specific details. Moreover, while the following embodiments will primarily be described in relation to the single-layer coding specification AVC and its SVC extension, it will be readily apparent that the technique described herein may also be practiced with other single-view video codecs such as HEVC. Furthermore, while in the following reference will be made to MPEG-4 compatible file formats and RTP-based sessions, the technique discussed herein can also be implemented using other file formats and transport protocols.

Those skilled in the art will further appreciate that the methods, steps and functions explained herein may be implemented using individual hardware circuitry, using software functioning in conjunction with a programmed microprocessor or general purpose computer, using an Application Specific Integrated Circuit (ASIC) and/or using one or more Digital Signal Processors (DSPs). It will also be appreciated that while the following embodiments are primarily described in the form of methods and devices, the technique disclosed herein may also be embodied in a computer processor and a memory coupled to the processor, wherein the memory stores one or more programs that perform the steps discussed herein when executed by the processor.

While the following description will primarily focus on video aspects of a multimedia system, it should be noted that any video content transmission may be accompanied by a transmission of audio, text or any other multimedia content. It should also be noted that the technique presented herein is not restricted to a multimedia system but could also be implemented in pure video systems such as Closed Circuit Television (CCTV) systems for surveillance or other purposes.

Figure 1:
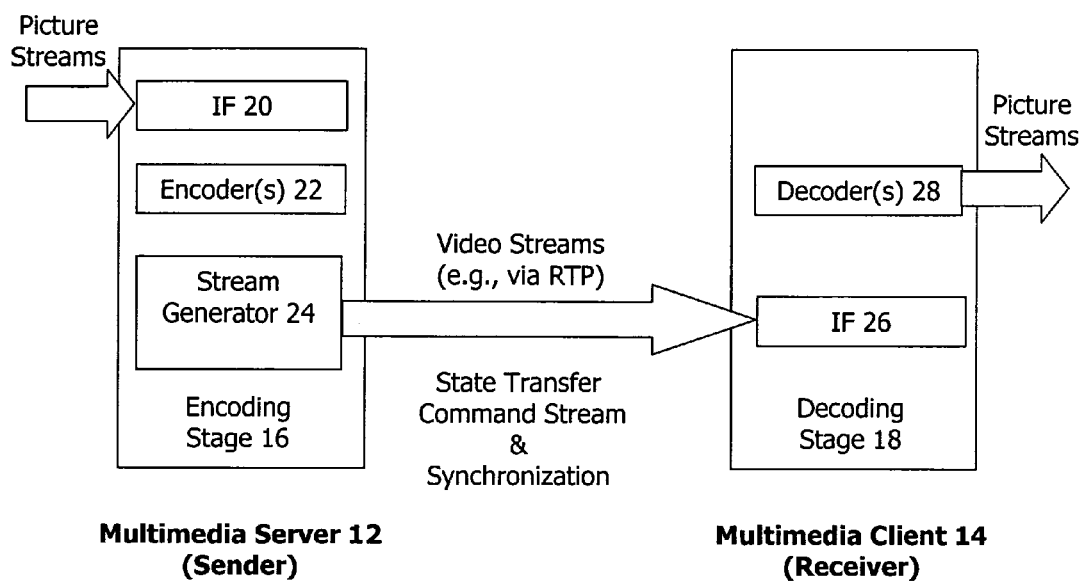

FIG. 1 illustrates a multimedia system embodiment of the encoding and decoding technique presented herein. As shown in FIG. 1, the multimedia system comprises a multimedia server 12 acting as a sender of video streams as well as a multimedia client 14 acting as a receiver. As an example, the video streams transmitted from the multimedia server 12 to the multimedia client 14 may belong to a 3D movie film or a free viewpoint sports event.

In the multimedia system embodiment of FIG. 1, the multimedia server 12 could be operated by a content service provider and be realized in the form of a web server. The multimedia client 14, on the other hand, could be any mobile or stationary device capable of rendering multimedia content. The multimedia client 14 may thus take the form of a smartphone, notebook, Personal Computer (PC), and so on.

The multimedia server 12 and the multimedia client 14 are connected via a wired, wireless or partially wired and partially wireless network link. The network link may at least partially be routed through the Internet or any other public or private network. Content transmission from the multimedia server 12 to the multimedia client 14 is performed under control of RTP or any other suitable content transfer protocol such as IP, TCP/UDP and MPEG-2/4.

As shown in FIG. 1, the core component of the multimedia server 12 is an encoding stage 16, and the core component of the multimedia client 14 is a decoding stage 18. The encoding stage 16 of the multimedia server 12 comprises an interface 20, one or more encoders 22 as well as at least one stream generator 24. The decoding stage 18 of the multimedia client 14 comprises an interface 26 as well as one or more decoders 28.

The interface 20 of the multimedia server 12 is configured to receive two or more picture streams belonging to two or more associated video views. The interface 20 may, for example, comprise camera interfaces for receiving live picture streams from multiple cameras in a free viewpoint scenario pertaining to a specific live event (e.g., a soccer match or a car race). In another realization, the interface 20 may take the form of a database interface for retrieving two (or more) picture streams relating to a 3D movie film from a local database.

The multi-view picture streams received via the interface 20 are forwarded to the one or more encoders 22. The one or more encoders 22 are configured to encode the picture streams based on a single-view video codec. The encoding operations are based on internal encoder state transfers as will be described in more detail below. The output of the one or more encoders 22 is fed to the stream generator 24. The stream generator 24 generates a multimedia stream (including multiple video streams) and transmits the resulting multimedia stream via unicast or multicast (e.g., broadcast) in an RTP session to the multimedia client 14.

At the multimedia client 14, the multimedia stream is received via the interface 26 of the decoding stage 18. In the embodiment illustrated in FIG. 1, the interface 26 is realized in the form of a network interface. The multimedia stream received via the interface 26 is forwarded to the one or more decoders 28. The one or more decoders 28 are configured to decode the multimedia stream, including the multiple video streams, based on internal decoder state transfers as will be described in more detail below. During the decoding operations, the original picture streams are recovered. The recovered picture streams output by the one or more decoders 28 may in a next step be rendered on a video display of the multimedia client 14 or stored in a local database (e.g., in an MPEG-4 compatible file format).

In the following, the configuration of the one or more encoders 22 of the multimedia server 12 as well as of the one or more decoders 28 of the multimedia client 14 will be discussed in more detail with reference to the exemplary apparatus embodiment illustrated in FIG. 2. The embodiment of FIG. 2 shows a parallel arrangement of both the decoders 22 and the decoders 28.

Figure 2:
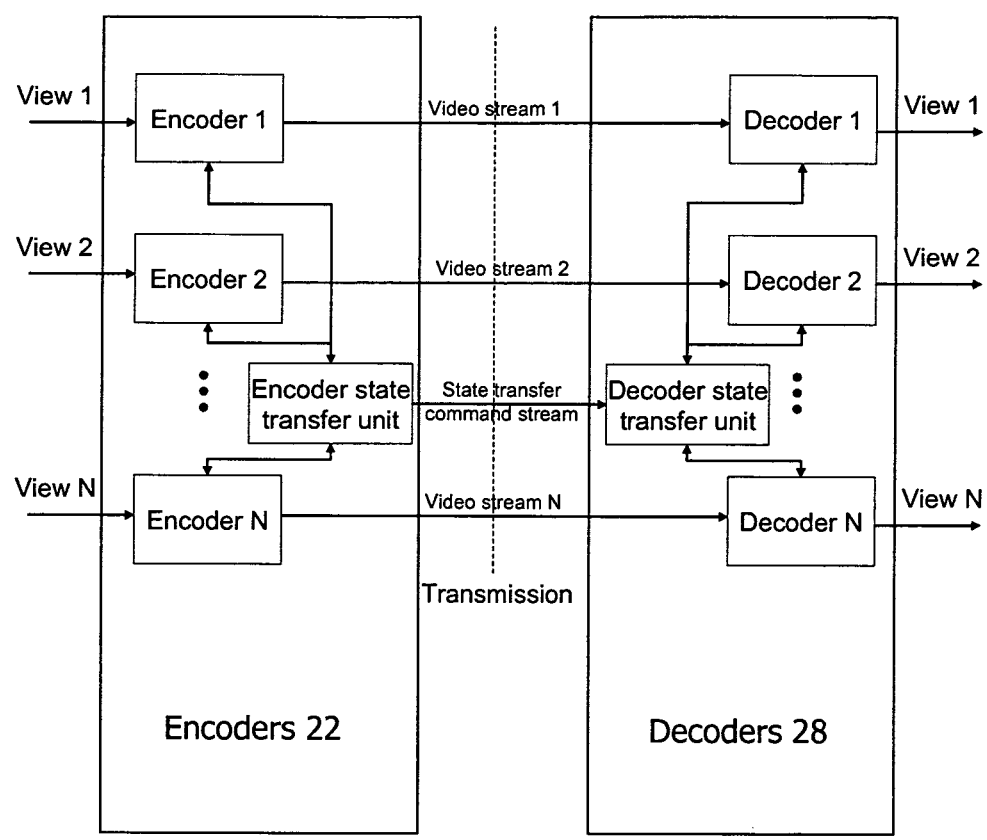
FIG. 2 schematically illustrates a first apparatus embodiment of an encoding stage in the sender and a decoding stage in the receiver of FIG. 1.

Considering N ($N \geq 2$) views to be encoded, a dedicated encoder/decoder pair is associated with each view in the exemplary embodiment illustrated in FIG. 2. More specifically, after encoding a picture for view n ($1 \leq n \leq N$), the output of encoder n (i.e., the encoded video bitstream) is sent to the input of decoder n, which decodes the video stream to recover the picture for view n. This general encoding operation resembles a conventional "simulcast" encoding of two or more views without exploiting any redundancies between the views. However, in contrast to the simulcast setup, the encoding stage 16 comprises an encoder state transfer unit (see FIG. 2). The encoder state transfer unit is provided to transfer encoder state information from any encoder n1 to any other encoder n2 prior to the encoding operation of encoder n2.

The operation of the encoders 22 shown in FIG. 2 will now be described in more detail with reference to the schematic flow diagram 300 of FIG. 3. The flow diagram 300 relates to a method embodiment illustrating the operation of the encoding stage 16 or any similar encoding stage comprising an encoder state transfer mechanism. To explain the general principle underlying the encoding approach presented herein, the method embodiment of FIG. 3 will be described for the exemplary case of N=2 encoders arranged in parallel.

Each encoder n can be regarded as an essentially unmodified single-view video encoder that complies with a certain single-view video coding specification (or "codec") and generates a video stream also complying with this single-view video coding specification. At time T, encoder n encodes the $T^{th}$ picture of view n. The encoded information output by encoder n is transferred via the stream generator 24 (see FIG. 1) in video stream n to the receiver side (see FIG. 2).

Figure 3:
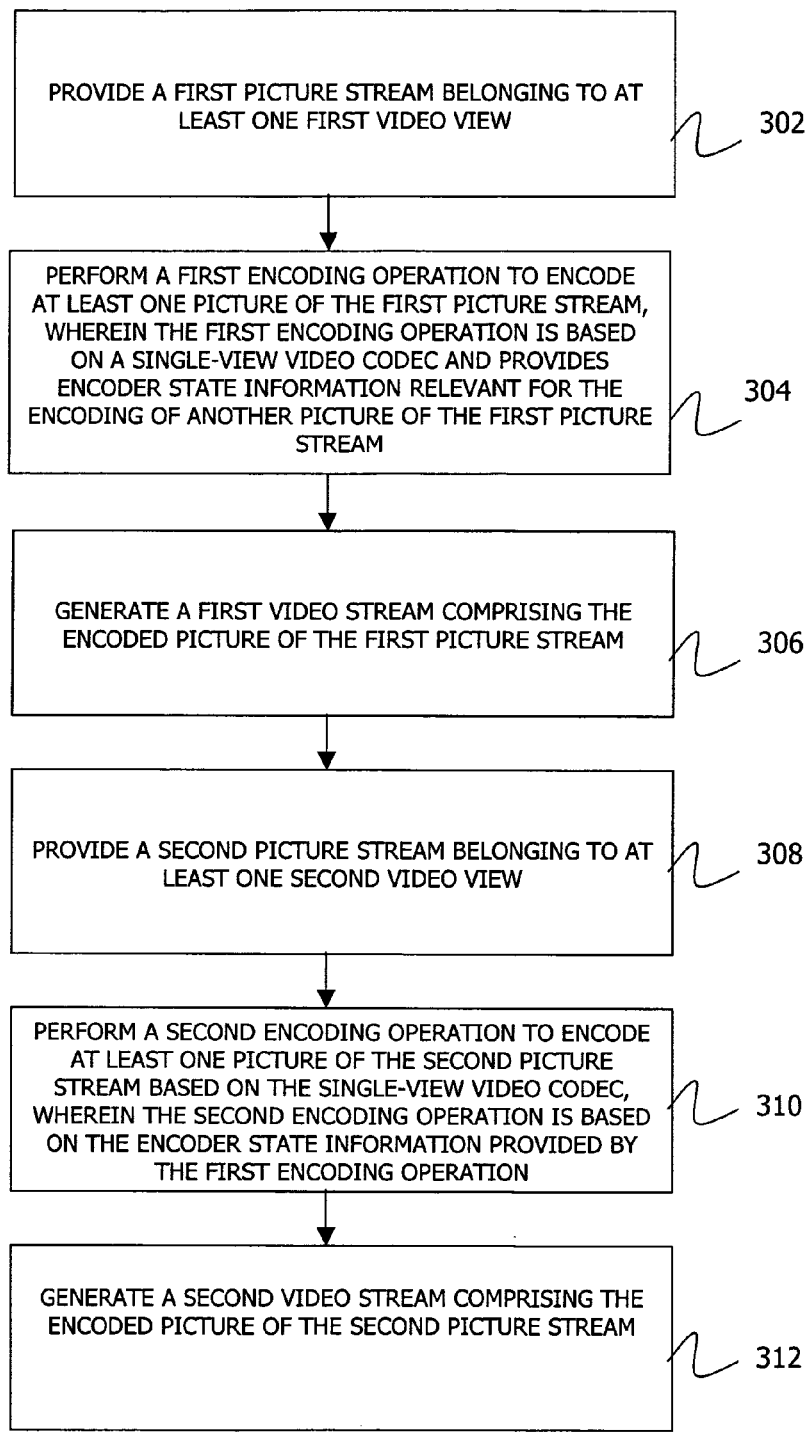
FIG. 3 is a schematic flow diagram illustrating a method embodiment of an encoding operation.

As illustrated in FIG. 3, the operation of the encoders 22 starts in step 302 with receipt of a first picture stream corresponding to "view 1" via the interface 20. The operation continues in step 304 with the encoder 1 performing a first encoding operation to encode one or more of the multiple successive pictures included in the first picture stream. The encoding operation performed by encoder 1 is based on a single-view video codec such as AVC, SVC or HEVC. During the encoding operation, encoder state information is generated and stored in a local memory (not shown) associated with encoder 1.

In the present embodiment, the encoder state information is information generated by encoder 1 in the context of encoding one or more first pictures of the first picture stream to be utilized for predictively encoding one or more second pictures of the first picture stream in a subsequent encoding operation by encoder 1. The encoder state information may, for example, include a list of pictures already encoded by encoder 1 ("reference pictures") and available for so-called predictive encoding of one or more subsequent pictures of the first picture stream. The encoder state information may also comprise the reference pictures themselves.

In a next step 306, encoder 1 outputs the encoded pictures of the first picture stream to the stream generator 24 (see FIG. 1). The stream generator 24 generates a first video stream comprising the encoded pictures of the first picture stream and transmits the resulting first video stream to the associated decoder 1 of the decoder stage 18 (see FIG. 2).

In a further step 308, which may be performed concurrently with step 302, a second picture stream belonging to a second video view ("view 2") is provided by the interface 20 to encoder 2. Then, in step 310, encoder 2 performs a second encoding operation to encode one or more of the multiple pictures of the second picture stream based on the single-view video codec also utilized by encoder 1.

As encoder 1 and encoder 2 operate based on the same single-view video codec, they can be assumed to be essentially identical, and for this reason encoder 2 can perform the corresponding second encoding operation in step 310 based on the encoder state information generated by encoder 1 in the context of the first encoding operation in step 304. For this purpose, the encoder state information stored in the local memory associated with encoder 1 can be transferred (e.g., copied or swapped) into another local memory associated with encoder 2. As a result, the second encoding operation performed by encoder 2 can be based on the encoder state information generated during the first encoding operation by encoder 1. It should be noted in this context that the first encoding operation related to a picture of the first picture stream, whereas the second encoding operation relates to a picture of the second picture stream.

Transfer of the encoder state information from (a memory associated with) encoder 1 to (a memory associated with) encoder 2 is performed by the encoder state transfer unit illustrated in FIG. 2. The encoder state transfer operations performed by the encoder state transfer unit are triggered by an encoder state transfer control mechanism incorporated in the encoder state transfer unit. The encoder state transfer control mechanism triggers encoder state transfer operations in accordance with a preconfigured transfer scheme.

In the transfer scheme, an encoder state transfer operation may, for example, be triggered after certain video picture types have been encoded. As an example, after encoding the $T^{th}$ picture of the first picture stream (view 1) as a so-called "I-frame" (i.e., as a video picture encoded in a self-contained manner) by encoder 1, the resulting encoder state information of encoder 1 is transferred to encoder 2. Encoder 2 will then encode the $T^{th}$ picture of the second picture stream (view 2) based on the encoder state information generated by encoder 1. Encoder 2 will thus generate a so-called "P-frame" (i.e., a predictively encoded video picture). Based on the same encoder state information, encoder 1 encodes the $(T+1)^{th}$ picture of the first picture stream (view 1) to also generate a "P-frame".

Figures 4, 5:
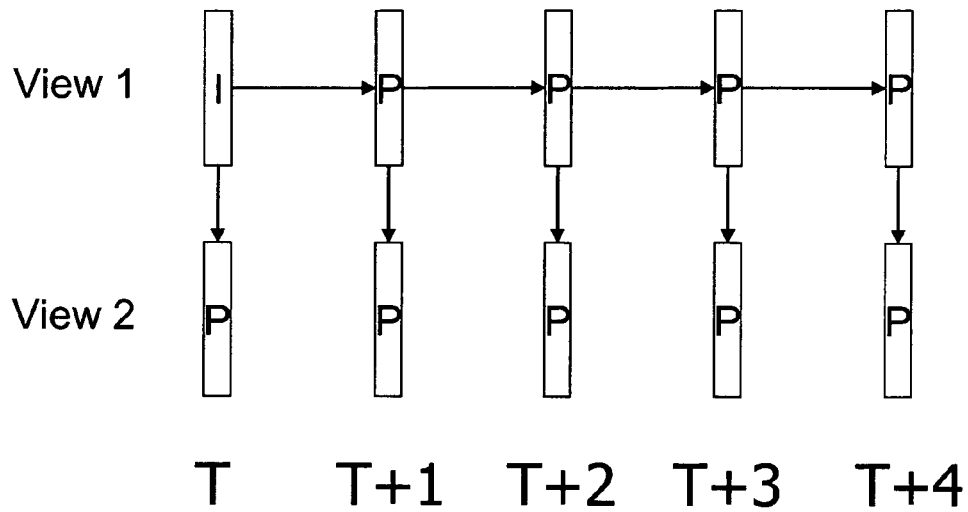
FIG. 4 is a diagram schematically illustrating the transfer of encoder stage information.
FIG. 5 illustrates a pseudo-code embodiment of a sender flow.

The resulting prediction structure is illustrated in the schematic diagram of FIG. 4. As becomes apparent from FIG. 4, the encoder state information generated by encoder 1 in a subsequent step when predictively encoding the $(T+1)^{th}$ picture of the first picture stream is used for predictively encoding the $(T+1)^{th}$ picture of the second picture stream as well as the $(T+2)^{th}$ picture of the first picture stream, and so on.

The transfer scheme presented herein also enables adaptive decisions on state transfer operations. Such adaptive decisions may, for example, be based on input about encoding results (e.g., coding distortion or coding cost information) from either one of the encoders. An embodiment of such an adaptive transfer scheme for the sender side is illustrated in a pseudo-code representation in FIG. 5 (and for the receiver side in FIG. 8).

The state information is temporarily saved/stored by the state transfer units by means of "Save_state(S)" and "Load_state(S)" commands, where "S" indicates a state marker to identify a saved state later at loading time. "Send_initialization_data(N)" and "N=Receive_initialization_data( )" denote functions to send_initialization information (number of views N in the present example) from the sending to the receiving side. Likewise, "Send_state_transfer_command(S)" and "S=Receive_state_transfer_command( )" denote examples of functions for sending/receiving of state transfer commands, where in this case a command "S" means that state "S" is used for encoding/decoding.

"Encode_pic(V,T)" and "Decode_pic(V,T)" are used to encode and decode, respectively, the $T^{th}$ picture of view V, including writing and reading, respectively, of encoded video data to/from the video stream. Finally, "Test_encode_pic(V,T)" has the same meaning as "Encode_pic(V, T)", excluding writing of encoded video data to the video stream. It returns the cost of encoding a frame by means of some cost criterion such as the "Lagrangian cost" that is typically used in video coding.

In the embodiment illustrated in FIG. 4, encoder 1 and encoder 2 operate on the same encoder state operation (as generated by encoder 1) although they encode pictures belonging to different picture streams. It should be noted that the pictures of the first picture stream are encoded by encoder 1 based on encoder state information only derived from previously encoded pictures of the first picture stream (but not of encoded pictures belonging to the second picture stream). This prediction approach results in a backwards compatible "baselayer view" (view 1). In other words, the encoded video stream associated with the first video view can be decoded by a standard decoder based on the standard single-view video codec in use.

The encoding approach discussed with reference to FIGS. 3 and 4 can be readily extended to scenarios with three or more encoders as shown in FIG. 2. If, for example, N=3, each time after encoding the $T^{th}$ picture of the first picture stream in encoder 1, the resulting encoder state information of encoder 1 is transferred to encoder 2, which encodes the $T^{th}$ picture of the second picture stream based on the encoder state information received from encoder 1 as explained above. In a next step, the encoder state information generated by encoder 2 when encoding the $T^{th}$ picture of the second picture stream is transferred to encoder 3, which encodes the $T^{th}$ picture of the third picture stream based on the encoder state information received from encoder 2, and so on. Alternatively, the encoding operation of encoder 3 (and each higher order encoder) regarding the $T^{th}$ picture may also be based on the encoder state information delivered for the $T^{th}$ picture by encoder 1 to speed up the encoder state information transfer process.

In a similar manner as the output of encoder 1, the output of encoder 2 (and of any higher order encoder) is fed to the stream generator 24 of FIG. 1. In step 312, which may be performed concurrently with step 306, the stream generator 24 generates a second video stream comprising the encoded pictures delivered by encoder 2. The resulting second video stream is then transmitted together with the first video stream is a multimedia stream to the multimedia client 14 as shown in FIG. 1.

The transmission of the video streams from the multimedia server 12 to the multimedia client 14 is accompanied by the optional transmission of state transfer information. To this end, a state transfer command stream may be established between the multimedia server 12 and the multimedia client 14 as shown in FIGS. 1 and 2. Each state transfer command may carry information about the operation of the encoder state transfer unit. Specifically, a state transfer command may carry state transfer information about when an encoder state has been transferred and between which encoders states have been transferred. Optionally, the state transfer information may also carry information about the number of encoders connected to the encoder state transfer unit and/or the number of views encoded. An exemplary state transfer command may thus comprise the following state transfer information with respect to the prediction structure illustrated in FIG. 4: "After encoding picture T of view 1 by encoder 1, the encoder state of encoder 1 was transferred to encoder 2, which then encoded picture T of view 2".

The state transfer commands may be multiplexed into one or more of the video streams transmitted from the multimedia server 12 to the multimedia client 14 ("inband transmission") or may be transmitted separately ("out-of-band transmission"). For example, in the exemplary case of N=2, the state transfer commands may be multiplexed with the content of the second video stream (view 2), whereas the first video stream (view 1) may be transmitted separately. Such an approach preserves the backwards compatibility of the first video stream.

The state transfer commands may be temporally synchronized with the video streams by means of a synchronization mechanism provided by the transmission protocol (e.g., RTP). One example when such a synchronization is desirable is when the state transfer command stream is sent out-of-band (i.e., via a separate transport channel or session and not together with the encoded video streams). Since the video streams can only be correctly decoded when decoder state transfer operations are correctly performed (e.g., in accordance with the corresponding encoder state transfer operations), it is desirable to temporally synchronize the decoder state transfer operations with the decoding operations as will be described in more detail below.

Synchronization information can either be transferred implicitly or explicitly with the state transfer command stream (e.g., "After decoding picture T, transfer state of decoder n1 to decoder n2") or, if the state transfer command stream will not include such explicit instructions (e.g., if the command stream only contains the information "Transfer state of decoder n1 to decoder n2", without any temporal information), then the temporal synchronization can be achieved by means of a suitable transport protocol mechanism such as time stamps or sequence numbers (e.g., according to RTP/RTCP signaling similar to the signaling used to achieve video and audio synchronization for an RTP transmission).

In general, and in particular when the state transfer command stream is sent out-of-band, the state transfer command with a particular item of synchronization information should be received before the parts of the video streams are received which are referenced by the synchronization information. In this way it can be ensured that the correct synchronization information is available at the time a particular decoding operation is performed.

In one implementation, the stream generator 34 may be configured to generate an MVC-compliant multi-view video bitstream based on the output of the encoders 22. This implementation will now be discussed in more detail for a 3D video scenario with two encoders assuming that each of the encoders is configured H.264/AVC compliant. This compliancy requires certain encoder settings, such as restricting a reference picture list size to 1.

FIG. 6 schematically illustrates how an MVC-compliant bitstream is generated based on the output of two H.264/AVC encoders. It will be assumed that encoder 1 ("baselayer" encoder) is configured such that it encodes subsequent video pictures to generate encoded video frames according to an IPPI coding structure (i.e., first encoding an I-frame, then encoding two P-frames, and then repeatedly applying this encoding structure). More specifically, encoder 1 encodes the I-frames as so-called Instantaneous Decoding Refresh (IDR) pictures. Encoder 2 ("enhancement layer" encoder) is configured such that it outputs only P-frames, in a similar manner as illustrated in FIG. 4 for an IPPPPI coding structure.

The operation of baselayer encoder and enhancement layer encoder is as follows. First, baselayer encoder encodes one frame for the first picture stream, then enhancement layer encoder encodes one frame for the second picture stream, then baselayer encoder encodes the next frame for the first picture stream, and so on. After generating an I-frame, the encoder state of baselayer encoder is copied to the enhancement layer encoder. Baselayer encoder and enhancement layer encoder are both configured such that the number of reference frames to be used for P-frames is 1. This restriction is used to prevent so-called diagonal prediction, which is prohibited in MVC. Also, both encoders are configured such that they encode one "slice" per frame.

According to the H.264/AVC specification, baselayer encoder as well as enhancement layer encoder output the respective video stream as a sequence of so-called Network Abstraction Layer (NAL) units, i.e., as packets of video data. First, each encoder outputs a Sequence Parameter Set (SPS) and a Picture Parameter Set (PPS). These parameter sets include general information needed for decoding the video streams, such as information about the frame sizes and the utilized encoding algorithms (i.e., video profiles). The parameter set information is repeated before each I-frame. For each encoded I-frame, baselayer encoder outputs an IDR/NAL unit. For each P-frame, the respective encoder outputs a "non-IDR-slice" NAL unit.

The two resulting NAL unit streams output by the two encoders are processed by the stream generator 24 in a two-step approach for achieving MVC-compliancy. In a first processing step, for the baselayer stream, a "prefix" NAL unit is added before each "IDR" and "non-IDR-slice" NAL unit, formatted according to the MVC specification. For the enhancement layer stream, the type of each "non-IDR-slice" NAL unit is changed to "coded slice extension" NAL unit by changing the unit nal_unit_type syntax element in the video bitstream. The type of "SPS" NAL unit is changed to "subset SPS" NAL unit, and the formatting is changed according to the MVC specification. Also, for the enhancement layer stream, in addition to the first "subset SPS", more "subset SPS" are created and inserted at the beginning of each anchor point where pictures coded after that point are not allowed to refer to pictures before that point (e.g., once there is an IDR picture in the baselayer, the corresponding picture in the enhancement layer and the IDR picture together are set to be an anchor point).

In a second processing step, the two NAL unit streams are interleaved (i.e., multiplexed in time), starting from the first NAL unit of the baselayer stream, in an alternating manner as shown at the bottom of FIG. 6. In case a NAL unit from the baselayer is later taken by a decoder and it is of type "prefix", then the immediately following NAL unit is taken as well. If two NAL units of type "PPS" follow each other immediately in the resulting bitstream, then the second NAL unit is regarded as redundant and may be removed. It will be apparent that the NAL unit configuration approach of FIG. 6 can be applied in a similar manner in the case of other encoder configurations (e.g., when using B-frames) or when having multiple slices per frame.

With respect to the embodiment illustrated in FIG. 2, it has been mentioned above that at time T, encoder n encodes the $T^{th}$ picture of view n. Thus, all encoders n=0 . . . N-1 are considered to work (essentially) in parallel. In this parallel encoding embodiment, there may still be a dependency between views and, therefore, a need for sequential operations. An example for such a dependency is when a state derived from an encoding operation with respect to a picture of a first view is transferred to an encoding operation with respect to a picture of a second view, with both pictures relating to time instant T.

In terms of parallelism, there may in fact be various configurations that can lead to different performance in terms of coding efficiency. Two exemplary scenarios may be defined as follows:

1. Sequential scenario (high coding efficiency profile)
   Code view 1 frame, save state_view1
   Load state_view1, code view 2 frame, save state_view2
   Load state_view2, code view 3 frame, save state_view3
   . . .
   Load state_view(N-1), code view N frame, save state_viewN
2. Hierarchical scenario (low delay profile)
   Code view 1 frame, save state_view1
   Load state_view1, code view 2 frame
   Load state_view1, code view 3 frame
   . . .
   Load state_view In the first ("sequential") scenario, since neighboring views (i.e., views taken by neighboring video cameras) have generally more similarity than a view pair having a larger distance (in terms of the distance between the associated video cameras), state transfer operations between encoders associated with neighboring views may produce a better coding efficiency. On the other hand, to encode or decode view N, the encoder/decoder must wait until all views 1 to N-1 have been encoded/decoded. In real-time scenarios, this constraint could limit parallel processing efficiency. Such the limit can be avoided in the second ("hierarchical") scenario, in which only encoder state information of the encoder associated with the "baselayer" view (view 1) is transferred and all the remaining encoders perform their respective encoding operation based on this particular encoder state information. As a variation, there could be multiple levels of hierarchy instead of only a single hierarchy level as in the above example. Also, the sequential and hierarchical processing scenarios could be mixed as needed.

Moreover, it will be appreciated that the sharing of state information prevents a full parallelism in the scenario of FIG. 2 with multiple encoders 22 (and multiple decoders 28) being arranged in parallel. When such a state sharing is not present or can (at least temporarily) be switched off, the parallelism of the multiple encoders 22 (and multiple decoders 28) can be fully exploited (assuming the single-view codecs in use have no further "cross" dependencies).

Having described the operation of the encoding stage 16, the operation of the decoding stage 18, and in particular of its decoders 28, will be explained now with continued reference to FIG. 2. In a similar manner as the encoders 22, the decoders 28 at the receiver side (see, e.g., FIG. 2) can be essentially unmodified video decoders complying with a given single-view video codec. Each decoder decodes a dedicated video stream such that at time T, decoder n decodes the $T^{th}$ picture of the video stream pertaining to view n, and forwards the decoded picture to an output device (such as a video display) or a storage device (such as a multimedia database).

The decoders 28 receive, via the interface 26, the N video streams from the multimedia server 12. As shown in FIG. 2, the (optional) state transfer command stream as generated by the encoder state transfer unit is received by a dedicated decoder state transfer unit associated with the decoders 28. As has been mentioned above, the state transfer command stream may be multiplexed with one or more of the video streams. This means that a de-multiplexing operation may be required before processing these streams further. The state transfer command stream can be omitted if the information contained therein is a priori known on the receiver side. Such a priori knowledge may, for example, be derived from a preceding negotiation process between the multimedia server 12 and the multimedia client 14, by means of standardization, and in other ways.

Figures 7, 8:
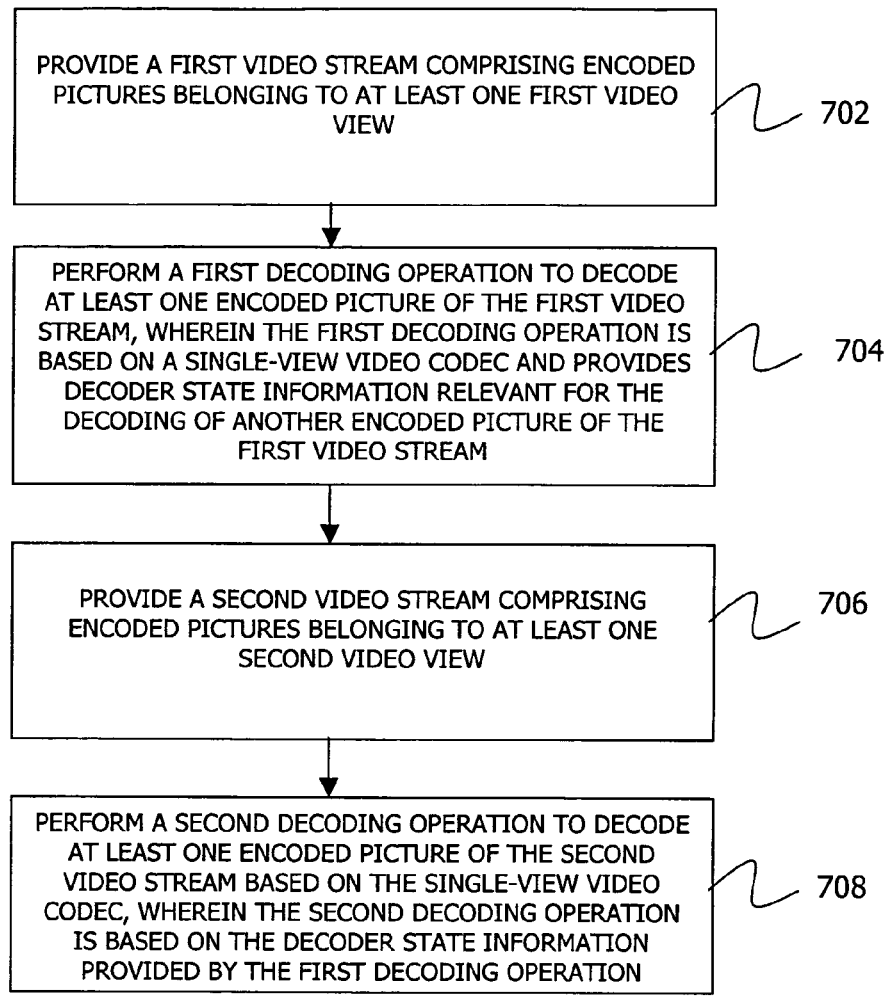
FIG. 7 is a schematic flow diagram illustrating a method embodiment of a decoding operation.
FIG. 8 illustrates a pseudo-code embodiment of a receiver flow.

In the following, the operation of the decoders 28 illustrated in FIG. 2 will exemplarily be described for the scenario of N=2 decoders 28 and with reference to the schematic flow diagram 700 of FIG. 7. The flow diagram 700 illustrates a method embodiment of the operation of the decoders 28, or, more generally, of a decoding stage 18 having a decoder state transfer mechanism.

In an initial step 702, the interface 26 provides a first video stream comprising encoded pictures belonging to the first video view (view 1) to decoder 1. Decoder 1, in step 704, performs a first decoding operation to decode an encoded picture included in the first video stream. The first decoding operation is based on a single-view video codec (e.g., AVC, SVC, or HEVC) and provides decoder state information relevant for the decoding of another encoded picture of the first video stream. In a similar manner as on the encoder side, the decoder state information may, for example, include a list of already decoded pictures ("reference pictures") that are available for "P-frame" or "B-frame" decoding of subsequent pictures. Also, the decoder state information may include the already decoded pictures as such.

In step 706, which can be performed essentially simultaneously with step 702, the interface 26 provides a second video stream comprising encoded pictures belonging to the second video view (view 2) to decoder 28. Then, in step 708, decoder 2 performs a second decoding operation to decode an encoded picture of the second video stream based on the same single-view video codec also utilized by decoder 1. The second decoding operation performed by decoder 2 is based on the decoder state information provided by the first decoding operation by decoder 1. Since decoder 1 and decoder 2 are assumed to be essentially identical, it is possible to simply copy the decoder state information stored in a local memory associated with decoder 1 to a local memory associated with decoder 2.

The corresponding decoder state transfer is performed by the decoder state transfer unit. As illustrated in FIG. 2, the decoder state transfer unit is configured to receive the state transfer command stream from its counterpart, the encoder state transfer unit associated with the encoders 22. In this way, the decoder state transfer unit will be informed about the number of video views transmitted, the number of decoders needed (i.e., in a software realization, the number of decoders to be created before the actual video decoding operations can start), and the decoding relationships between the individual decoders or decoding operations (i.e., indicating a transfer scheme for controlling the decoder state information transfer operations).

The decoder state transfer unit may comprise a decoder state control mechanism that enforces a given decoder state information transfer scheme. As an example, the decoder state transfer control mechanism may trigger state transfer operations in accordance with the state transfer command stream received from the multimedia server 12. An exemplary state transfer command received from the multimedia server 12 may instruct the decoder state transfer unit as follows: "After decoding picture T of view 1 by decoder 1, transfer the decoder state of decoder 1 to decoder 2, which then decodes picture T of view 2". A pseudo-code representation of the corresponding state transfer operation is illustrated in FIG. 8 and has already been discussed above in connection with FIG. 5.

In one scenario, an MVC-compliant multi-view video stream generated by two H.264/AVC encoders as described above with reference to FIG. 6 may be received. In such a scenario, decoder 1 and decoder 2 will both be implemented as a H.264/AVC decoder. The de-multiplexing and decoding of the MVC-compliant multi-view video bitstream can be performed in the reverse order of the steps illustrated in FIG. 6. That is, in a first processing step the input bitstream is de-interleaved into a base-layer stream and an enhancement layer stream by taking NAL units from the input stream in an alternating manner, taking two NAL units if one is of type "prefix", and possibly duplicating "PPS" NAL units. In a second processing step, NAL units of type "prefix" are eliminated. Moreover, NAL units of type "subset SPS" are converted into "SPS" NAL units and NAL units of type "coded slice extension" are converted into "non-IDR slice" NAL units. Then, in a third processing step, the resulting bitstreams are decoded using baselayer and enhancement layer decoders, copying the state of baselayer decoder to enhancement layer decoder after decoding of an I-frame.

Instead of using N encoders at the sender side to encode N views (FIG. 2), fewer than N encoders may be used (e.g., only one encoder). In such a scenario illustrated in the apparatus embodiment of FIG. 9, a single encoder 22 used for encoding pictures belonging to different views may operate in a time-interleaved manner. That is, if N=2, one or more pictures of view n1 may be encoded first by encoder 22, then encoder 22 may encode one or more pictures of view n2, and then again one or more pictures of view n1, and so on.

Figure 9:
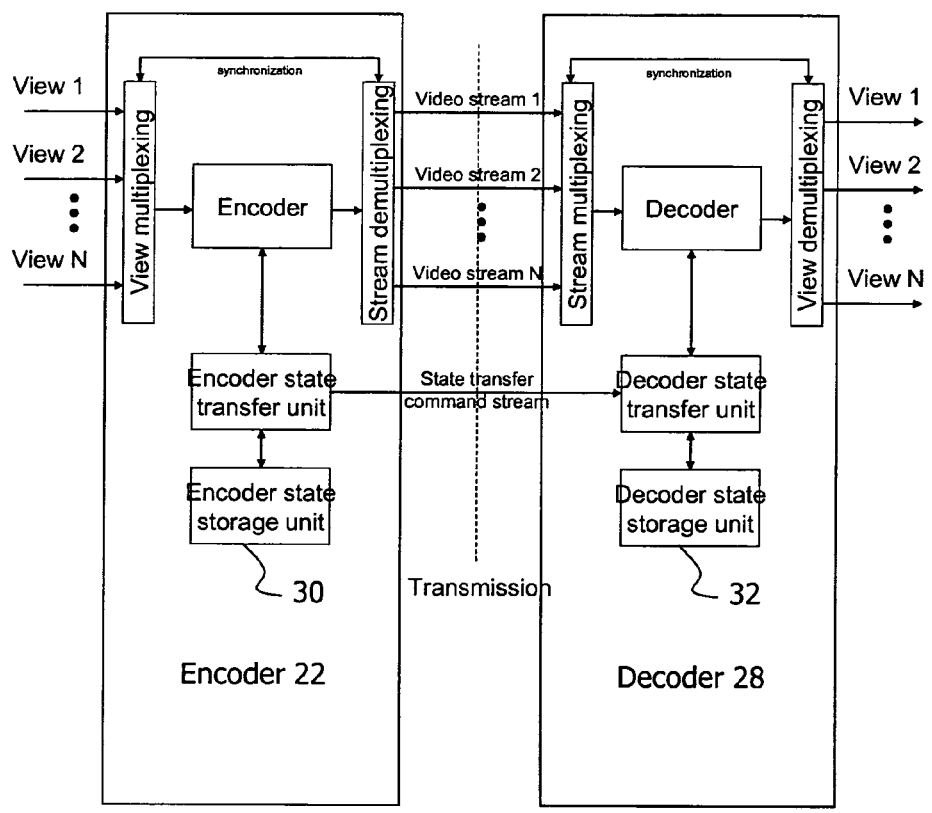
FIG. 9 schematically illustrates a second apparatus embodiment of an encoding stage in the sender and a decoding stage in the receiver of FIG. 1.

In the scenario of FIG. 9, an encoder state storage unit 30 is coupled to the encoder state transfer unit, and in a similar manner a decoder state storage unit 32 is coupled to the decoder state transfer unit. Instead of transferring encoding and decoding state information directly between individual encoders or decoders (or their associated memories), respectively, as shown in FIG. 2, the corresponding state transfer information is temporarily buffered in the storage units 30, 32 as will now be explained in more detail with reference to FIG. 9.

In the embodiment illustrated in FIG. 9, the N picture streams corresponding to the N views are multiplexed before they are fed into the single encoder 22. The multiplexing operation can be implemented in various ways. As an example, sequential temporal multiplexing may be used such that one or more pictures pertaining to view 1 are encoded first by the encoder, then one or more pictures of view 2, then one or more pictures of view 3, and so on. The encoded video stream at the output of the encoder will reflect the multiplexing at its input. This means that in the example above, the first portion of the video stream will be associated with view 1, the second portion with view 2, the third portion with view 3, and so on.

A de-multiplexer at the output of the encoder may be used to de-multiplex the resulting video stream into N separate video streams (so that each video stream corresponds to one view). In such a situation, the de-multiplexing operation at the encoder output needs to be synchronized with the multiplexing operation at the encoder input. It should be noted that the multiplexing and de-multiplexing operations illustrated in FIG. 9 could also be performed by the interface 20 and the stream generator 24 of FIG. 1, respectively.

The encoder state transfer unit is configured to transfer encoder state information from and to the encoder state storage unit 30 (i.e., to save and load the encoder state as described with reference to FIGS. 5 and 8 above). If multiple encoder states (e.g., of different encoders) need to be saved, the stored encoding states will at saving time be marked with unique markers so that they can uniquely be identified at loading time. The actual encoder state transfer operations are performed according to a pre-defined transfer scheme as described above.

For the case of two picture streams (N=2), an exemplary sequence of encoding and state saving and loading operations could be realized as follows:
1. Encode 1 picture associated with View 1
2. Save the encoder state in storage unit 30 and mark it as "State 1"
3. Encode 1 picture associated with View 2
4. Load the encoder state in storage unit 30 marked as "State 1"
5. Go to Step 1.

In this example, a picture of view 1 is encoded first. In a next step, a picture view 2 is encoded and, thereafter, the encoder state after encoding the picture of view 1 is restored. With this strategy, both view 1 and view 2 are encoded using the same state information ("State 1") as has already been described above with reference to FIG. 4.

In the scenario illustrated in FIG. 9, the encoder state transfer unit is configured to send state transfer commands (including synchronization information, information about the configuration of the encoder and the number of views) in a similar manner as in the embodiment illustrated in FIG. 2. Although not illustrated in FIG. 9, it will be assumed that the encoder state transfer unit is aware of the details of the multiplexing and de-multiplexing operations before and after encoding. As a result, the state transfer operations can be performed synchronously with the multiplexing and demultiplexing operations.

Using the saving/loading of states, the functionality of the multiple encoders 22 of FIG. 2 can be emulated by the single encoder 22 of FIG. 9 such that the N video streams as well as the state transfer command stream transmitted from the multimedia server 12 to the multimedia client 14 will be the same for the two embodiments illustrated in FIGS. 2 and 9.

On the receiver side of FIG. 9, the N video streams are multiplexed into one single video stream before the decoding process, which is performed by a single decoder 28. Moreover, the picture stream recovered by the decoding process is synchronously de-multiplexed such that video pictures decoded from information carried in video stream n will be associated with view n after the multiplexing, decoding and demultiplexing operations as illustrated in FIG. 9.

The decoder 28 comprises a decoder state transfer unit configured to transfer decoder state information from and to the decoder state storage unit 32 (i.e., to save and load decoder state information). The decoder state transfer unit is configured to control the state transfer in accordance with the state transfer commands received from the encoder state transfer unit. As has already been explained above with respect to the embodiment illustrated in FIG. 2, the decoder state transfer unit may also be configured to receive information about the required decoder configuration and the number of views. The decoder state transfer unit may be aware of the details of the multiplexing and de-multiplexing operations before and after decoding. As a result, the state transfer operations can be performed synchronously with the multiplexing operations.

By means of the state saving and loading operations, the functionality of the multiple decoders 28 illustrated in FIG. 2 can be emulated by the single decoder 28 illustrated in FIG. 9. Consequently, if the N video streams as well as the state transfer command streams transmitted in the embodiments of FIGS. 2 and 9 are the same, the emulation will cause that the decoded views will also be the same.

As has been mentioned above, the sending sides in FIGS. 2 and 9 may be configured such that they produce identical output video streams for the same input picture streams. Likewise, the receiving sides in FIGS. 2 and 9 may be configured such that they produce identical output picture streams for the same input video streams. It is thus apparent that a multimedia system as shown in FIG. 1 with a sender that has N encoders (N≥2) may have a receiver with a single decoder, and that a multimedia system with a sender that has a single encoder may have a receiver with N decoders (N≥2). It is also apparent that other configurations with different numbers of encoders and decoders are possible as well.

Other embodiments may include M encoders and/or decoders (M≥2) with N>M. In such and other embodiments dynamic load balancing between the multiple encoders/decoders or encoder/decoder groups may be performed. The load balancing may be based on CPU load or any other metrics.

It is also possible to implement only the sending side or the receiving side in accordance with the technique presented herein. The complementary component may in such an embodiment be implemented in a conventional or any other manner. As an example, a conventional MVC encoding component may be used at the sending side, and the receiving side may be implemented as illustrated in FIG. 2 or in FIG. 9 (or vice versa).

As has become apparent from the above description of exemplary embodiments, each input to the encoding stage 16 is in general a 2D picture sequence. It will be apparent that each of these 2D picture sequences can actually carry more than one video view. For example, each "input view" (e.g., view 1) in FIG. 2 may carry a stereo pair (two views) that is spatially or temporally interleaved according to the "H.264/AVC stereo SEI" or "H.264/AVC frame packing arrangement SEI" approaches. According to these approaches, two picture streams are encoded as one 2D video stream (using a single-view video codec), and Supplemental Enhancement Information (SEI) messages transmitted in addition to the video stream indicate that the video stream contains a pair of stereo views. There exist several flags in the SEI message indicating how the two views are arranged in the video stream (including possibilities for spatial and temporal interleaving of the views).

Figure 10:
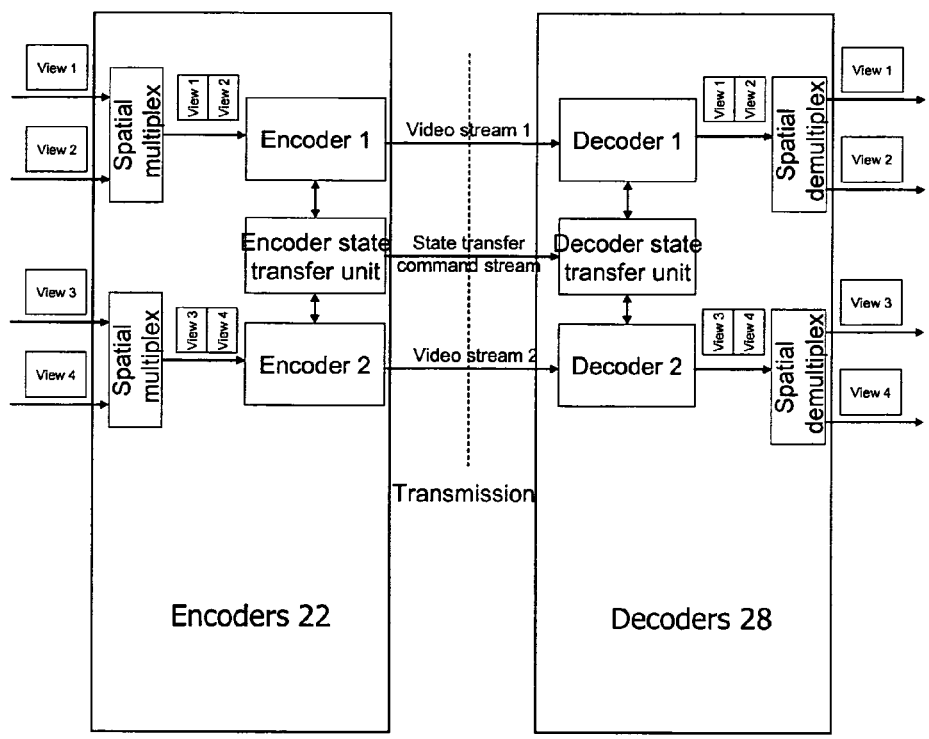
FIG. 10 schematically illustrates a third apparatus embodiment of an encoding stage in the sender and a decoding stage in the receiver of FIG. 1.

FIG. 10 illustrates an embodiment compatible with the "H.264/AVC stereo SEI" approach in which two "input views", each carrying a stereo pair of picture streams, are encoded. The embodiment illustrated in FIG. 10 is based on the embodiment of FIG. 2, for the case N=2. It is extended such that the input of each encoder 1 and 2 (and the output of each decoder 1 and 2), denoted as view n in FIG. 2, is itself a multiplexed version of two views.

The multiplexing and de-multiplexing operations indicated in FIG. 10 are special cases of the corresponding operations illustrated in the embodiment of FIG. 9. Thus, the embodiment of FIG. 10 can be regarded as a combination of the embodiments of FIGS. 2 and 9. The special multiplexing and de-multiplexing operations illustrated in FIG. 10 pertain to spatial multiplexing and de-multiplexing as defined in the "H.264/AVC stereo SEI" or "H.264/AVC frame packing arrangement SEI" specifications.

It will be appreciated that the transfer and the (optional) storage of encoder and decoder state information may be associated with a large data throughput. To decrease the data throughput in an actual implementation, one may analyze the specifics of the single-view video codec in use and copy only a portion of the encoder and decoder state information from the associated internal memories or storage units 30, 32 associated with the encoder(s) 22 and decoder(s) 28. As an example, the state transfer information may be restricted to reference pictures.

It will be appreciated that while the preceding embodiments have primarily be described in the context of encoder and decoder state information derived from (complete) reference pictures, the state information could also relate to picture portions that have already been encoded such as a subset of blocks or macro-blocks of a picture. Still further, the encoder state information may relate to information pertaining to motion vectors, to states of an entropy coding engine and so on.

In an exemplary I-frame scenario with macro-blocks, the encoder state information may thus comprise or relate to previously encoded surrounding macro-blocks ("reference macro-blocks"). The encoder state information may in such a scenario be copied for a macro-block in one view pertaining to time instant T to a co-located macro-block in another view pertaining to the same time instant. The encoder state transfer could also be performed between macro-blocks within a single view (e.g., in a scenario with a repetitive pattern or in a mirrored scenario). It should be noted that the encoder state transfer operations can not only be performed on a picture or macro-block level, but also on a slice or any other level. Moreover, it will be appreciated that the decoder state transfer operations may be performed in a complementary manner.

As has become apparent from the above description of exemplary embodiments, the separation of (e.g., 3D) multi-view functionality from the actual encoding and decoding operations (i.e., the compression technology) permits to define a codec-agnostic approach for encoding multiple video views using a single-view (e.g., 2D) video codec. Interfaces, protocols and other codec-specific components for clients, displays, and so on that rely on a particular multi-view related functionality can thus be based on a common platform or standard regardless of the underlying compression technology.

The multi-view approach presented herein can immediately take advantage of state-of-the-art single-view video codecs for multi-view purposes. As a result, the lead time for multi-view technologies will be reduced and kept in line with single-view (e.g., 2D) video standardization.

The present technique easily supports generation of backwards compatible bitstreams (i.e., the generation of an encoded bitstream such that a meaningful 2D video can be decoded from a portion of the encoded bitstream). Apparently, the technique can also be used for more general encoding configurations if backwards compatibility is not necessary, thereby providing potential encoding efficiency improvements over backwards compatible solutions such as MVC.

In the foregoing, principles, embodiments and various modes of implementing the technique disclosed herein have exemplarily been described. However, the present invention should not be construed as being limited to the particular principles, embodiments and modes discussed above. Rather, it will be appreciated that variations and modifications may be made by a person skilled in the art without departing from the scope of the present invention as defined in the following claims.

The invention claimed is:

1. A method, performed in an encoding apparatus, of encoding data pertaining to at least two video views, the method comprising:

providing a first picture stream belonging to at least one first video view;

performing a first encoding operation to encode at least a portion of a first picture of the first picture stream based on a single-view video codec, wherein the first encoding operation provides encoder state information relating to reference information for predictively encoding at least a portion of a second picture of the first picture stream or of another portion of the first picture of the first picture stream;

generating a first video stream comprising the encoded picture of the first picture stream;

providing a second picture stream belonging to at least one second video view;

performing a second encoding operation to encode at least a portion of a picture of the second picture stream based on the single-view video codec and the encoder state information provided by the first encoding operation; and generating a second video stream comprising the encoded picture of the second picture stream, wherein the first encoding operation and the second encoding operation are performed by a single encoder, wherein the first picture stream and the second picture stream are multiplexed before performing the encoding operations, and wherein the resulting encoded video stream is de-multiplexed for generating the first video stream and the second video stream.

2. The method of claim 1, further comprising transmitting the first video stream and the second video stream in a format defined by a multi-view video specification.

3. The method of claim 1, wherein encoding operations performed in relation to the first picture stream are performed based on encoder state information derived from one or more pictures of the first picture stream only.

4. The method of claim 1, further comprising transmitting information indicative of at least one of:
the number of video views encoded; and
the number of encoders involved in encoding the video views.

5. The method of claim 1, further comprising buffering the encoder state information provided by the first encoding operation for transfer to the second encoding operation.

6. The method of claim 1, further comprising transmitting state transfer information relating to a transfer of the encoder state information provided by the first encoding operation for use by the second encoding operation.

7. The method of claim 6, further comprising synchronizing transmission of the first video stream and the second video stream with the transmission of the state transfer information.

8. The method of claim 6, wherein the state transfer information comprises information indicative of at least one of:
the particular picture of the second picture stream that has been encoded in the second encoding operation based on the encoder state information; and
particulars of the first encoding operation that provided the encoder state information.

9. The method of claim 1, wherein the de-multiplexing operation is synchronized with the multiplexing operation.

10. The method of claim 1, wherein more than two picture streams belonging to more than two video views are provided, wherein the second encoding operation and any further encoding operation are each performed to encode at least a portion of a picture of the second picture stream and at least a portion of a picture of the respective further picture stream are based on the encoder state information provided by the first encoding operation.

11. The method of claim 1, wherein more than two picture streams belonging to more than two video views are provided, wherein at least a portion of a picture of a picture stream associated with a video view is encoded based on encoder state information provided by an encoding operation to encode at least a portion of a picture of a picture stream associated with a neighboring video view.

12. A method, performed in a decoding apparatus, of decoding data pertaining to at least two video views, the method comprising:
providing a first video stream comprising encoded pictures belonging to at least one first video view;
performing a first decoding operation to decode at least a portion of a first encoded picture of the first video stream based on a single-view video codec, wherein the first decoding operation provides decoder state information relating to reference picture information for decoding at least a portion of a second encoded picture of the first video stream or another portion of the first encoded picture;
providing a second video stream comprising encoded pictures belonging to at least one second video view; and
performing a second decoding operation to decode at least a portion of an encoded picture of the second video stream based on the single-view video codec and the decoder state information provided by the first decoding operation, wherein the first decoding operation and the second decoding operation are performed by a single decoder, wherein the first video stream and the second video stream are multiplexed into one single video stream before performing the decoding operations, and wherein the recovered decoded picture stream is de-multiplexed for generating a first picture stream and a second picture stream.

13. The method of claim 12, wherein a transfer of the decoder state information from the first decoding operation to the second decoding operation is synchronized with a transfer of the encoder state information from the first encoding operation pertaining to the first video stream to the second encoding operation pertaining to the second video stream.

14. The method of claim 12, further comprising buffering the decoder state information provided by the first decoding operation for transfer to the second decoding operation.

15. The method of claim 12 further comprising providing state transfer information relating to a transfer of encoder state information provided by a first encoding operation pertaining to the first video stream for use by a second encoding operation pertaining to the second video stream, wherein the state transfer information, or information derived therefrom, controls a transfer of the decoder state information provided by the first decoding operation to the second decoding operation.

16. The method of claim 15, wherein the state transfer information is received concurrently with the first video stream and the second video stream.

17. The method of claim 15, wherein the state transfer information is known a priori.

18. A non-transitory computer readable recording medium storing a computer program product for controlling an encoding apparatus to encode data pertaining to at least two video views, the computer program product comprising software instructions which, when run on a computing device in the encoding apparatus, causes the encoding apparatus to:
provide a first picture stream belonging to at least one first video view;
perform a first encoding operation to encode at least a portion of a first picture of the first picture stream based on a single-view video codec, wherein the first encoding operation provides encoder state information relating to reference information for predictively encoding at least a portion of a second picture of the first picture stream or of another portion of the first picture of the first picture stream;
generate a first video stream comprising the encoded first picture of the first picture stream;
provide a second picture stream belonging to at least one second video view;
perform a second encoding operation to encode at least a portion of a picture of the second picture stream based on the single-view video codec and the encoder state information provided by the first encoding operation; and
generate a second video stream comprising the encoded picture of the second picture stream, wherein the first encoding operation and the second encoding operation are performed by a single encoder, wherein the first picture stream and the second picture stream are multiplexed before performing the encoding operations, and wherein the resulting encoded video stream is de-multiplexed for generating the first video stream and the second video stream.

19. A non-transitory computer readable recording medium storing a computer program product for controlling a decoding apparatus to decode data pertaining to at least two video views, the computer program product comprising software instructions which, when run on a computing device in the decoding apparatus, causes the decoding apparatus to:
provide a first video stream comprising encoded pictures belonging to at least one first video view;
perform a first decoding operation to decode at least a portion of a first encoded picture of the first video stream based on a single-view video codec, wherein the first decoding operation provides decoder state information relating to reference picture information for decoding at least a portion of a second encoded picture of the first video stream or another portion of the first encoded picture;
provide a second video stream comprising encoded pictures belonging to at least one second video view; and
perform a second decoding operation to decode at least a portion of an encoded picture of the second video stream based on the single-view video codec and the decoder state information provided by the first decoding operation, wherein the first decoding operation and the second decoding operation are performed by a single decoder, wherein the first video stream and the second video stream are multiplexed into one single video stream before performing the decoding operations, and wherein the recovered decoded picture stream is de-multiplexed for generating a first picture stream and a second picture stream.

20. An encoding apparatus configured to encode data pertaining to at least two video views, the encoding apparatus comprising:

one or more interfaces configured to provide a first picture stream belonging to at least one first video view and a second picture stream belonging to at least one second video view;

one encoder configured to perform:
  a first encoding operation to encode at least a portion of a first picture of the first picture stream based on a single-view video codec, wherein the first encoding operation provides encoder state information relating to reference information for predictively encoding at least a portion of a second picture of the first picture stream or another portion of the first picture of the first picture stream; and
  a second encoding operation to encode at least a portion of a picture of the second picture stream based on the single-view video codec and the encoder state information provided by the first encoding operation; and one or more stream generation circuits configured to generate a first video stream comprising the encoded picture of the first picture stream and a second video stream comprising the encoded picture of the second picture stream, wherein the encoding apparatus is configured to multiplex the first picture stream and the second picture stream before performing the encoding operations, wherein the encoding apparatus is further configured to de-multiplex the resulting encoded video stream for generating the first video stream and the second video stream.

21. The encoding apparatus of claim 20, further comprising memory configured to buffer the encoder state information provided by the first encoding operation for transfer to the second encoding operation.

22. A decoding apparatus configured to decode data pertaining to at least two video views, the decoding apparatus comprising:

one or more interfaces configured to provide a first video stream comprising encoded pictures belonging to at least one first video view and a second video stream comprising encoded pictures belonging to at least one second video view; and one decoder configured to perform:
  a first decoding operation to decode at least a portion of a first encoded picture of the first video stream based on a single-view video codec, wherein the first decoding operation provides decoder state information relating to reference picture information for decoding at least a portion of a second encoded picture of the first video stream or another portion of the first encoded picture; and
  a second decoding operation to decode at least a portion of an encoded picture of the second video stream based on the single-view video codec and the decoder state information provided by the first decoding operation, wherein the decoder is configured to perform both the first decoding operation and the second decoding operation, wherein the first video stream and the second video stream are multiplexed into one single video stream before performing the decoding operations, and wherein the recovered decoded picture stream is de-multiplexed for generating a first picture stream and a second picture stream.

23. The decoding apparatus of claim 22, further comprising memory configured to buffer the decoder state information provided by the first decoding operation for transfer to the second decoding operation.

* * * * *